United States Patent
Stamm

(10) Patent No.: US 7,935,413 B2
(45) Date of Patent: May 3, 2011

(54) LAYER SYSTEM WITH LAYER HAVING DIFFERENT GRAIN SIZES

(75) Inventor: Werner Stamm, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 1057 days.

(21) Appl. No.: 11/784,984

(22) Filed: Apr. 10, 2007

(65) Prior Publication Data

US 2008/0160269 A1     Jul. 3, 2008

(30) Foreign Application Priority Data

Apr. 10, 2006   (EP) .................................... 06007526

(51) Int. Cl.
*B32B 7/02*      (2006.01)
(52) U.S. Cl. ..... 428/212; 428/220; 428/332; 428/411.1; 428/457; 428/680
(58) Field of Classification Search .................. 428/220, 428/212, 332, 411.1, 457, 680
See application file for complete search history.

(56) References Cited

U.S. PATENT DOCUMENTS

| | | | |
|---|---|---|---|
| 5,579,534 A * | 11/1996 | Itoh et al. | ................ 428/547 |
| 6,024,792 A | 2/2000 | Kurz et al. | |
| 6,165,600 A | 12/2000 | Ivkovich, Jr. et al. | |
| 2003/0207151 A1 | 11/2003 | Stamm | |
| 2006/0051608 A1 | 3/2006 | Halberstadt et al. | |

FOREIGN PATENT DOCUMENTS

| | | |
|---|---|---|
| EP | 0 412 397 A1 | 2/1991 |
| EP | 0 486 489 B1 | 5/1992 |
| EP | 0 786 017 B1 | 7/1997 |
| EP | 0 892 090 A1 | 1/1999 |
| EP | 1 204 776 B1 | 5/2002 |
| EP | 1260608 A1 * | 11/2002 |
| EP | 1 306 454 A1 | 5/2003 |
| EP | 1 319 729 A1 | 6/2003 |
| EP | 1 439 245 A1 | 7/2004 |
| EP | 1 455 003 A2 | 9/2004 |
| WO | WO 99/43861 A1 | 9/1999 |
| WO | WO 99/67435 A1 | 12/1999 |
| WO | WO 00/44949 A1 | 8/2000 |

* cited by examiner

*Primary Examiner* — Mark Ruthkosky
*Assistant Examiner* — Lawrence D Ferguson

(57) ABSTRACT

The layer system according to the invention uses different grain size distributions for the layer, in order to improve the bonding of the layer to a substrate; a different grain size distribution is used for the outer part of the layer.

19 Claims, 4 Drawing Sheets

LAYER SYSTEM WITH LAYER HAVING DIFFERENT GRAIN SIZES

CROSS REFERENCE TO RELATED APPLICATIONS

This application claims the benefits of European application No. 06007526.4 filed Apr. 10, 2006, and is incorporated by reference herein in its entirety.

FIELD OF INVENTION

The invention relates to a layer system in accordance with the claims.

BACKGROUND OF THE INVENTION

The use of layers to protect against corrosion and/or oxidation and for thermal barrier purposes is known in the prior art. In addition to this functional property of the layers, it is also important for the layers to be securely bonded to a substrate or for the layers to be securely bonded to one another. Therefore, it is known to use a metallic bonding layer which is applied between the substrate made from a superalloy and an outer ceramic thermal barrier coating. This metallic bonding layer is used to better match the ceramic to the metallic substrate. However, in this case too it is necessary for the ceramic layer to be securely bonded to the metallic bonding layer.

SUMMARY OF INVENTION

Therefore, it is an object of the invention to provide a layer system with good bonding of a ceramic layer or good bonding of a metallic layer to the substrate.

The object is achieved by a two-layer system as claimed in the claims.

The subclaims list further advantageous measures, which can be combined with one another in any desired way in order to achieve further advantages.

BRIEF DESCRIPTION OF THE DRAWINGS

Exemplary embodiments of the invention are explained in more detail in the figures, in which.

DETAILED DESCRIPTION OF INVENTION

Figure 1:
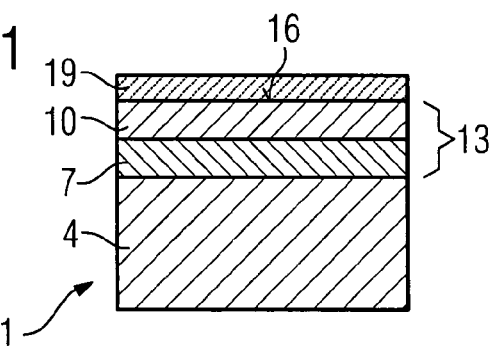
FIG. 1 diagrammatically depicts a layer system according to the invention.

FIG. 1 shows a layer system 1 according to the invention. The layer system 1 or the component 1 comprises a substrate 4 and a metallic layer 13, which has an outer surface 16. In particular in the case of high-temperature applications for the component 1, for example in a gas turbine 100 (FIG. 9) or a steam turbine, the substrate 4 consists of a nickel-based, cobalt-based or iron-based superalloy and is used for turbine blades or vanes 120, 130 (FIGS. 9, 10) or combustion chamber elements 155 (FIG. 11).

According to the invention, the layer 13 is composed of at least two sublayers.

It is preferable for the layer 13 to comprise just two sublayers and for it to comprise an inner layer 7 and an outer layer 10.

According to the invention, the powders used for the layers 7, 10 have different grain size distributions P1, P2.

The layer 13 preferably has a homogeneous composition and preferably consists of an MCrAlX alloy. It is preferable for a ceramic layer 19 to be applied to the layer 13, i.e. to the outer layer 10.

The powder used for the inner layer 7 preferably has a smaller grain size distribution P1 than a grain size distribution P2 of the powder used for the outer layer 10.

The smaller grain sizes of the powder having the grain size distribution P1 allows the layer 7, 13 to be more securely bonded to the substrate 4.

However, this smaller grain size distribution P1 would not be advantageous for the entire layer 10, 13 in respect of mechanical strength, in particular at high temperatures, where a more coarse-grained microstructure is advantageous.

The coarser grain size distribution P2 used for the outer layer 10 also allows a rougher surface 16 to be established, resulting in secure bonding for a further layer 19, in particular for a ceramic layer 19, which is preferably a plasma-sprayed layer. The corrosion resistance of the outermost layer 10 is also improved as a result.

Since the outer layer 10 is used, for example, merely to improve the bonding of a further, preferably ceramic layer, it can be a thin layer.

In particular in this case, the layer thickness of the inner layer 7 is thicker than the layer thickness of the outer layer 10. It is preferable for the inner layer 7 to be at least 100%-200% thicker than the other layers or the outer layer 10.

It is preferable for the inner layer 7 to be 150 μm thick and for the outer layer 10 to be 50 μm thick.

Therefore, an outer layer 10 is applied to the inner layer 7 but has a coarser grain size distribution P2 than the inner layer 7.

When applying the layers 7, 10 using plasma spraying (APS, VPS, LPPS), this can be achieved by using different powder fractions.

The grain size distribution P1 for the lower layer 7 preferably has grain sizes of $\geq 15$ μm, in particular $\geq 25$ μm. P1min is preferably 15 μm. A value of 25 μm can also advantageously be used for P1min.

The maximum value in the grain size distribution P1 is preferably 45 μm (=P1max).

It has proven particularly advantageous not to use excessively small powder grains for the smaller grain size distribution, since these in turn reduce the quality of bonding to the substrate 4.

It is preferable for the grain size distribution P2 for the outer layer 10 to have grain sizes of up to $\leq 75$ μm (=P2max). Preferably, P2max is =75 μm.

The minimum value P2min for the grain sizes of the grain size distribution P2 is preferably 45 μm.

It is advantageous not to use excessively large particles for the coarser grain size distribution P2 for the outer layer 10, since otherwise an excessively high porosity may result.

It is also possible for layers 7, 10 of this type to be produced using PVD or CVD processes, in which case the process parameters must be set in such a way as to form different grain sizes in the layers 7, 10.

A heat treatment which is preferably carried out to improve bonding to the substrate, in particular when using a metallic layer 7, 10, 13, causes all the grains of the layers 7, 10, 13 to grow, so that there is then no perceptible difference or scarcely any perceptible difference.

If the outer surface of the layer 13 is to be smoother, it is also possible to apply a third layer, for example having the grain size distribution P1.

Figure 2:
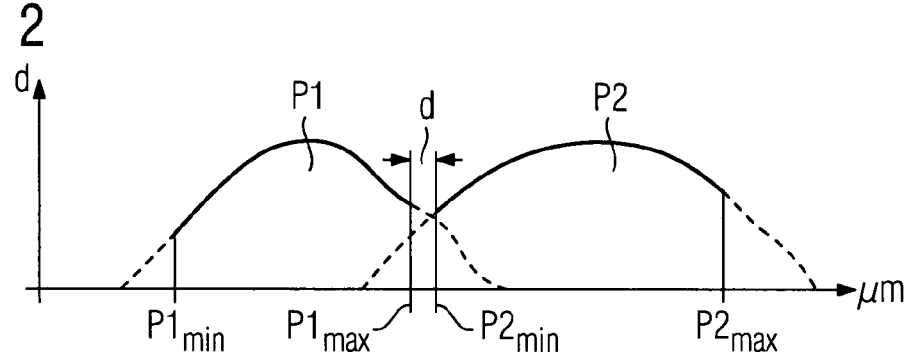
FIGS. 2-7 show examples of grain size distributions.

FIG. 2 diagrammatically depicts advantageous frequency distributions for the grain size distributions P1 and P2. The powder fraction P1, which is used for example for the inner layer 7, has for example been screened off in the lower range and the upper range. Therefore, the curve without fine and coarse powder particles being screened off is indicated by dashed lines. The coarser grain size distribution P2 has been produced in a corresponding way and is illustrated here in graph form.

There may be a distance d between the two grain size distributions P1, P2, i.e. the largest powder grain P1max of the smaller grain size distribution P1 is smaller than the smallest grain size P2min of the coarser grain size distribution P2.

Figure 3:
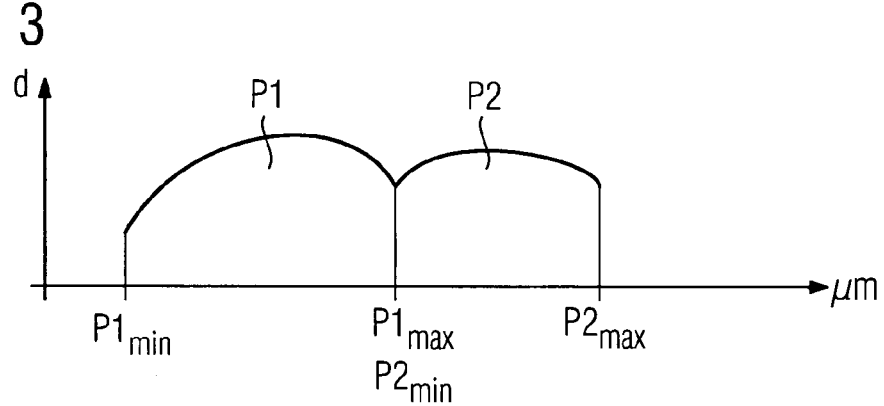

It is preferable for the grain size distribution P1, P2 to be set in such a way that the distance d is zero (FIG. 3).

Figure 4:
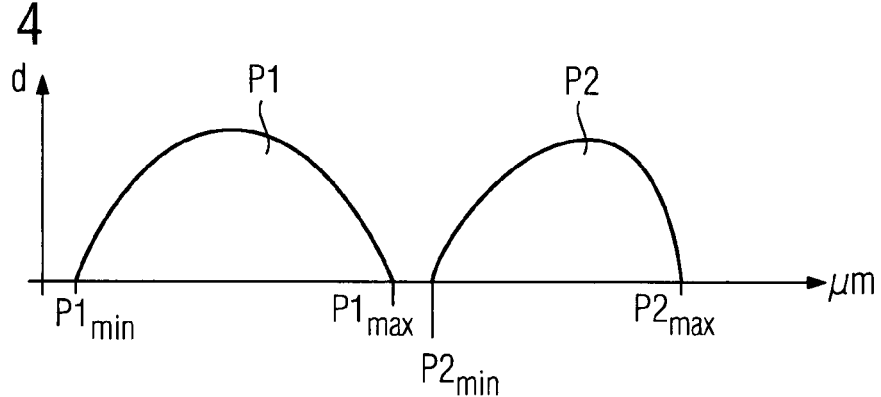
Figure 5:
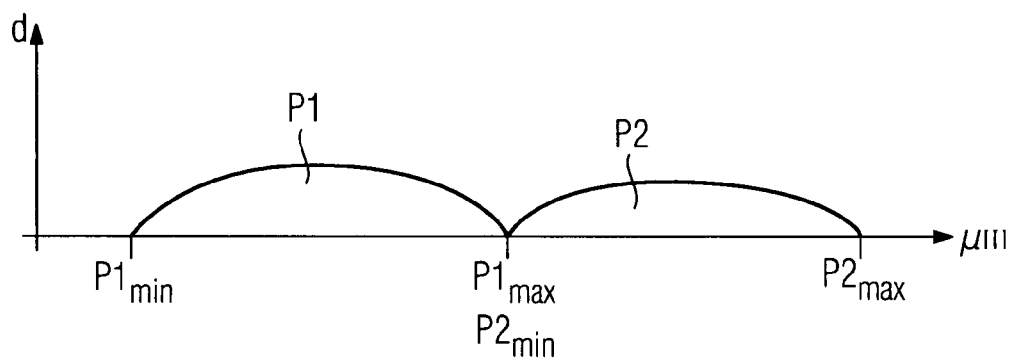
Figure 6:
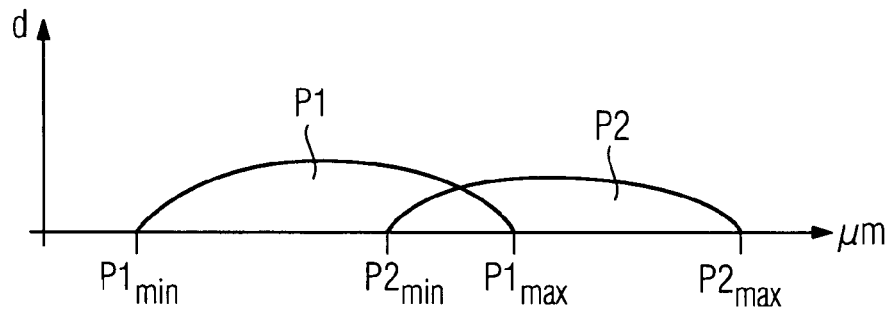

Further examples of the frequency distribution d are illustrated in FIGS. 4, 5 and 6.

In FIG. 4, the maximum P1max for the grain size distribution P1 is smaller than the minimum value P2min for the grain size distribution P2. Neither grain size distribution P1, P2 has been screened off.

In FIG. 5, based on FIG. 4, the values P1max and P2min are equal.

Figure 7:
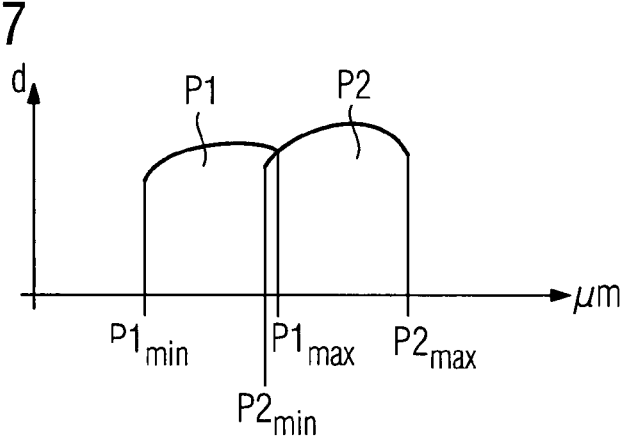

In FIGS. 6, 7, the distributions of the grain size distributions P1 and P2 overlap, i.e. P1max is greater than P2min, but in particular P1max≦1.2*P2min, but in particular P1max≦1.1*P2min.

A grain size distribution (e.g. P1 in FIG. 6) is smaller than another grain size distribution (e.g. P2 in FIG. 6) if the mean grain diameter of one grain size distribution is lower than the mean grain diameter of the other grain size distribution. The mean grain diameter of a grain size distribution is derived from the frequency of the grain sizes which occur in the grain size distribution.

Therefore, minor overlaps between P1max and P2min of from 10% to 15% are conceivable.

The grain sizes of the grain size distribution P1, P2 used for the layer 7, 10 may change during plasma spraying. However, this causes little or no change to the relative relationship between the two, i.e. the grain size distributions of the grain sizes of the layers 7, 10 have merely been shifted along the X axis.

In HVOF coating, an outer layer with a coarser grain size distribution is likewise built up, since HVOF generally produces very smooth surfaces, which are then not sufficiently rough for subsequent ceramic or metallic coating, i.e. does not offer sufficient anchoring sites, and therefore a final layer is built up with a coarser grain size distribution.

Figure 8:
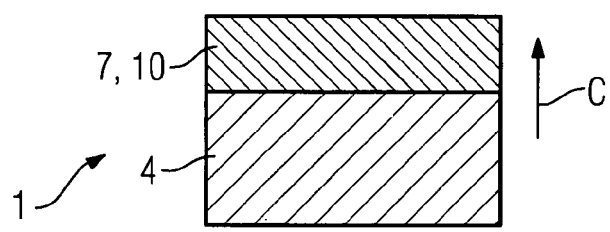
FIG. 8 shows a further exemplary embodiment of a layer system according to the invention.

The transition between the layers 7 and 10 need not be discrete, but rather may also be continuous (FIG. 8), by using the smaller powder fraction (grain size distribution P1) up to a certain layer thickness and then gradually reducing the proportion of the smaller powder fraction and adding an increasing proportion of the coarser powder fraction (grain size distribution P2), continuing this increase until it is only the latter powder fraction which is ultimately being fed to the plasma nozzle.

It is also possible for a third layer to be present between inner layer 7 and outer layer 10, in which third layer there is a gradual transition from P1 to P2, i.e. for example during plasma spraying the supply of finer powder is stopped and the coarser powder is gradually added to the mixture, until ultimately it is only the coarser powder P2 which is still being used.

Preferably, no heat treatment which leads for example to compacting or diffusion bonding is carried out after application of the inner layer 7 or before application of the outer layer 10, but rather this heat treatment preferably takes place after application of the layers 7, 10, on both layers together.

The compositions S1-S5 for the inner layer 7 and/or the outer layer 10 may be as follows, in wt %:
S1 Co-(29-31)Ni-(27-29)Cr-(7-9)Al-(0.4-0.8)Y-(0.5-0.9)Si,
  a. in particular Co-30Ni-28Cr-8Al-0.6Y-0.7Si;
S2 Co-(27-29)Ni-(23-25)Cr-(9-11)Al-(0.4-0.8)Y,
  b. in particular Co-28Ni-24Cr-10Al-0.6Y;
S3 Ni-(9-11)Co-(22-24)Cr-(11-13)Al-(0.4-0.8)Y-(2-3.5)Re,
  c. in particular Ni-10Co-23Cr-12Al-0.6Y-3Re;
S4 Ni-(11-13)Co-(20-22)Cr-(10-12)Al-(0.3-0.5)Y-(1-3)Re,
  d. in particular Ni-12Co-21Cr-11Al-0.4Y-2Re;
S5 Ni-(24-26)Co-(16-18)Cr-(9-11)Al-(0.3-0.5)Y-(0.8-1.8)Re,
  e. in particular Ni-25Co-17Cr-10Al-0.4Y-1.5Re.

Figure 9:
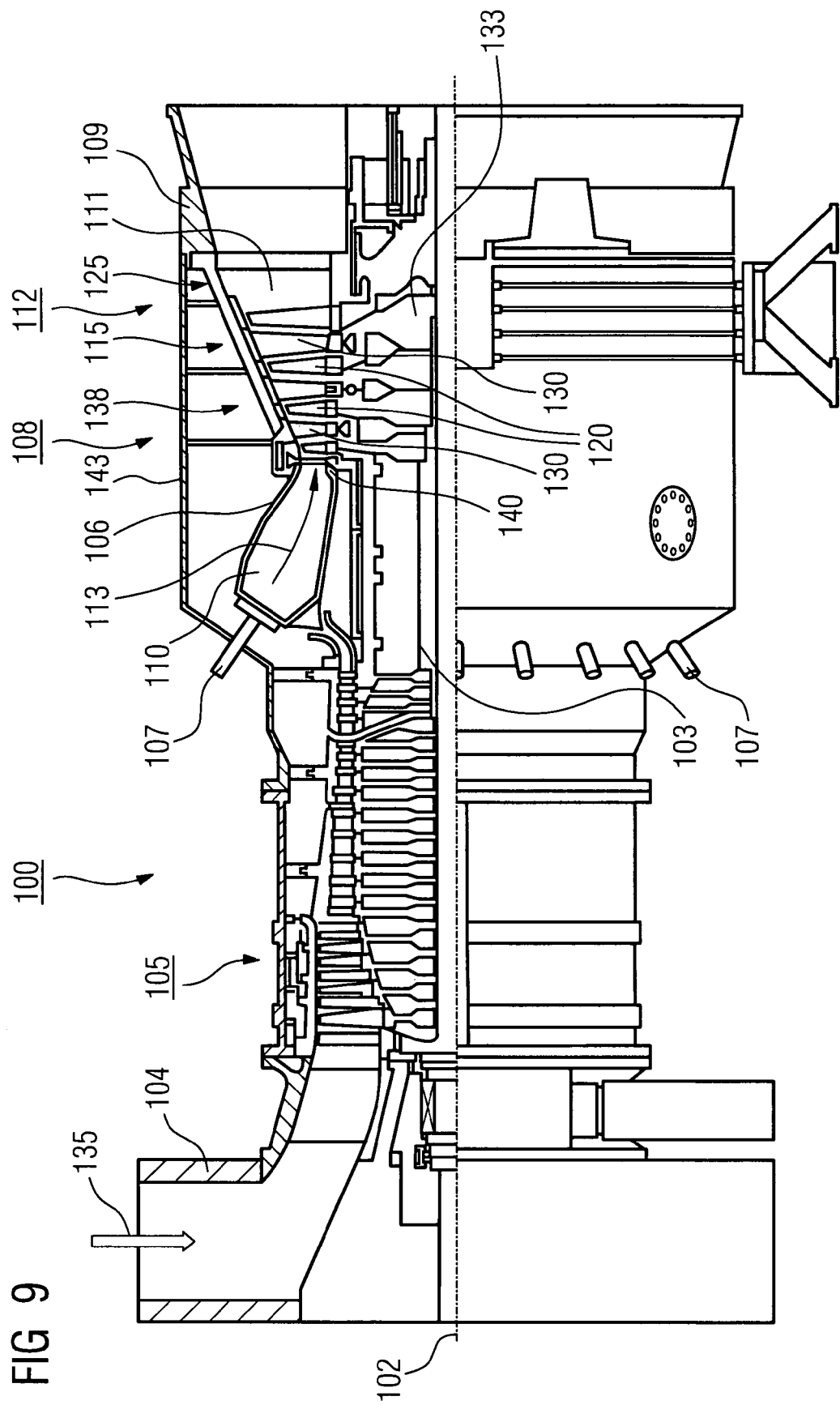
FIG. 9 shows a gas turbine.

FIG. 9 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 110, are subject to the highest thermal stresses.

To be able to withstand the temperatures which prevail there, they have to be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110. Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon, scandium (Sc) and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure with regard to the chemical composition. The coatings have the at least two-layered structure in accordance with the invention.

A thermal barrier coating, consisting for example of $ZrO_2$, $Y_2O_3$—$ZrO_2$, i.e. unstabilized, partially stabilized or completely stabilized by yttrium oxide and/or calcium oxide and/or magnesium oxide, may also be present on the MCrAlX.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 10:
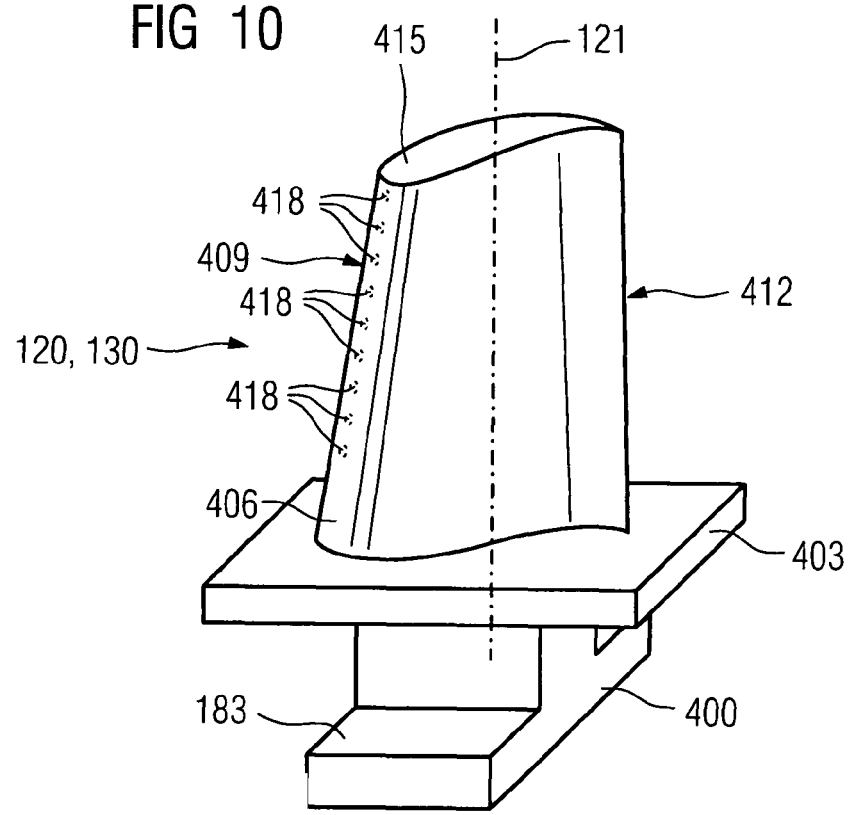
FIG. 10 shows a perspective view of a turbine blade or vane.
Figure 11:
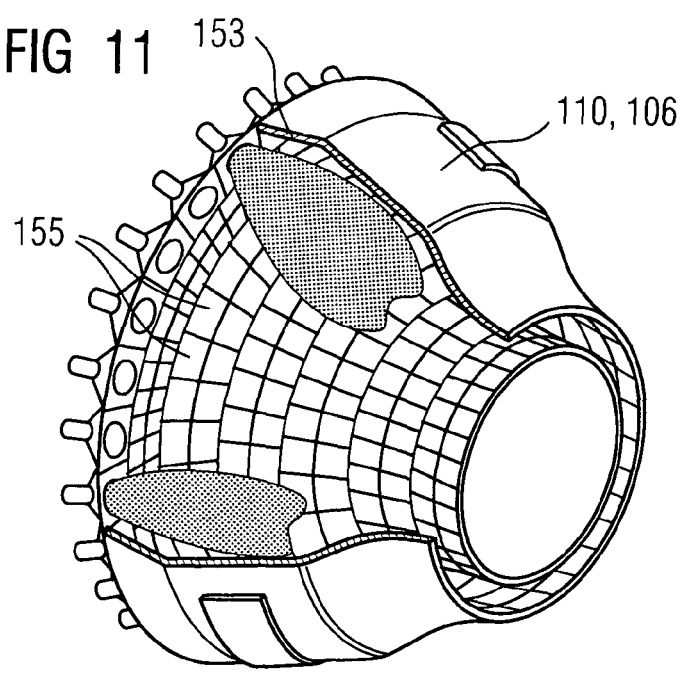
FIG. 11 shows a perspective view of a combustion chamber.

FIG. 10 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy. The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure.

The blades or vanes 120, 130 may likewise have coatings protecting against corrosion or oxidation (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy. The density is preferably 95% of the theoretical density.

A protective aluminum oxide layer (TGO=thermally grown oxide layer) forms on the MCrAlX layer (as an interlayer or as the outermost layer).

The coatings have the at least two-layer structure in accordance with the invention.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by means of suitable coating processes, such as for example electron beam physical vapor deposition (EB-PVD).

Other coating processes are conceivable, for example atmospheric plasma spraying (APS), LPPS, VPS or CVD. The thermal barrier coating may have grains which are porous or provided with microcracks or macrocracks in order to improve the resistance to thermal shocks. Therefore, the thermal barrier coating is preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

FIG. 11 shows a combustion chamber 110 of a gas turbine. The combustion chamber 110 is configured, for example, as what is known as an annular combustion chamber, in which a multiplicity of burners 107 arranged circumferentially around the axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), Nickel (Ni), X is an active element and stands for yttrium (Y) and/or silicon and/or at least one rare earth element, or hafnium (Hf). Alloys of this type are known from EP0486489B1, EP0786017B1, EP0412397B1 or EP1306454A1, which are intended to form part of the present disclosure with regard to the chemical composition of the alloy.

A for example ceramic thermal barrier coating, consisting of for example $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier coating by means of suitable coating processes, such as for example electron beam physical vapor deposition (EB-PVD). Other coating processes are conceivable, e.g. atmospheric plasma spraying (APS), LPPS, VPS or CVD. The thermal barrier coating may have grains which are porous or provided with microcracks or macrocracks, in order to improve the resistance to thermal shocks.

Refurbishment means that after they have been used, protective layers may have to be removed from heat shield elements 155 (e.g. be sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, on account of the high temperatures in the interior of the combustion chamber 110, a cooling system may be provided for the heat shield elements 155 and/or for their holding elements. The heat shield elements 155 are then, for example, hollow and may also have cooling holes (not shown) opening out into the combustion chamber space 154.

The invention claimed is:

1. A layer system, comprising:
a substrate; and
a plurality of metallic layers where an outer metallic layer is arranged above an inner metallic layer, wherein the layers are formed by a plurality of powder particles having differing grain size distributions, wherein the powder particle grain size distribution is between 15 μm and 75 μm,
wherein the composition (in wt %) of the inner layer and the outer layer is as follows: (29-31)Ni, (27-29)Cr, (7-9)Al, (0.4-0.8)Y, (0.5-0.9)Si, and remainder Co.

2. The layer system as claimed in claim 1, wherein the plurality of layers have the same chemical composition.

3. The layer system as claimed in claim 2, wherein a first grain size distribution of the powder for the inner layer is smaller than a second grain size distribution of the powder for the outer layer.

4. The layer system as claimed in claim 3, wherein the first grain size distribution has a first maximum value which is less than or equal to a second minimum value for the grain size distribution for the powder for the outer layer.

5. The layer system as claimed in claim 4, the first maximum value for the first grain size distribution corresponds to the second minimum value for second the grain size distribution.

6. The layer system as claimed in claim 4, wherein the first maximum value for the first grain size distribution is smaller than the second minimum value for the second grain size distribution.

7. The layer system as claimed in claim 6, wherein the first maximum value for the first grain size distribution is 45 μm.

8. The layer system as claimed in claim 7, wherein the second minimum value for the grain size distribution is 45 μm.

9. The layer system as claimed in claim 8, wherein the grain sizes within the layers change continuously in the direction from a substrate toward an outer surface of the outer metallic layer.

10. The layer system as claimed in claim 9, wherein the layer system has two metallic layers.

11. The layer system as claimed in claim 10, wherein the inner layer is twice as thick as the outer layer.

12. The layer system as claimed in claim 11, wherein the layers consists of an MCrAlX alloy,
wherein M is at least one element selected from the group consisting of iron, cobalt, and nickel, and
wherein X is an active element and represents yttrium and/or silicon, scandium and/or at least one rare earth element or hafnium.

13. The layer system as claimed in claim 12, wherein the substrate is nickel or cobalt based.

14. The layer system as claimed in claim 13, wherein a ceramic layer is arranged on the outer layer.

15. The layer system as claimed in claim 14, wherein no heat treatment for diffusion bonding is performed after application of the inner layer or before application of the outer layer.

16. A layer system, comprising:
a substrate; and
a plurality of metallic layers where an outer metallic layer is arranged above an inner metallic layer, wherein the layers are formed by a plurality of powder particles having differing grain size distributions, wherein the powder particle grain size distribution is between 15 μm and 75 μm, wherein the composition (in wt %) of the inner layer and/or the outer layer is as follows: (27-29)Ni, (23-25)Cr, (9-11)Al, (0.4-0.8)Y, and remainder Co.

17. A layer system, comprising:

a substrate; and a plurality of metallic layers where an outer metallic layer is arranged above an inner metallic layer, wherein the layers are formed by a plurality of powder particles having differing grain size distributions, wherein the powder particle grain size distribution is between 15 μm and 75 μm, wherein the composition (in wt %) for the inner layer and the outer layer is as follows: (9-11)Co, (22-24)Cr, (11-13)Al, (0.4-0.8)Y, (2-3.5)Re and remainder Ni.

18. A layer system, comprising:

a substrate; and a plurality of metallic layers where an outer metallic layer is arranged above an inner metallic layer, wherein the layers are formed by a plurality of powder particles having differing grain size distributions, wherein the powder particle grain size distribution is between 15 μm and 75 μm, wherein the composition (in wt %) for the inner layer and of the outer layer is as follows: (11-13)Co, (20-22)Cr, (10-12)Al, (0.3-0.5)Y, (1-3)Re, and remainder Ni.

19. A layer system, comprising:

a substrate; and a plurality of metallic layers where an outer metallic layer is arranged above an inner metallic layer, wherein the layers are formed by a plurality of powder particles having differing grain size distributions, wherein the powder particle grain size distribution is between 15 μm and 75 μm, wherein the composition (in wt %) for the inner layer and the outer layer is as follows: (24-26)Co, (16-18)Cr, (9-11)Al, (0.3-0.5)Y, (0.8-1.8)Re and remainder Ni.

* * * * *